April 6, 1926.

R. C. G. STAATS-OELS 1,579,671

SEARCHLIGHT ATTACHMENT FOR RIFLES

Filed Nov. 3, 1924 2 Sheets-Sheet 1

INVENTOR
Rudolph C. G. Staats-Oels
BY Richards Geier
ATTORNEYS

April 6, 1926.  R. C. G. STAATS-OELS  1,579,671
SEARCHLIGHT ATTACHMENT FOR RIFLES
Filed Nov. 3, 1924   2 Sheets-Sheet 2
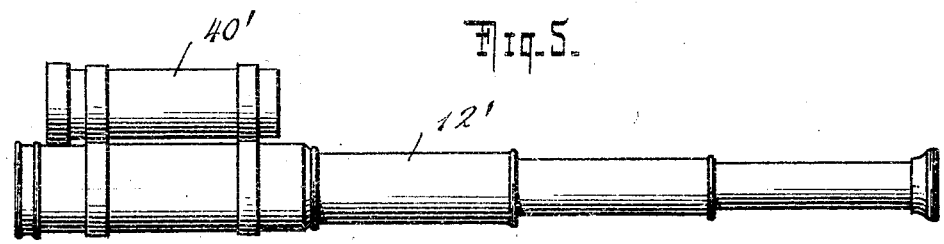
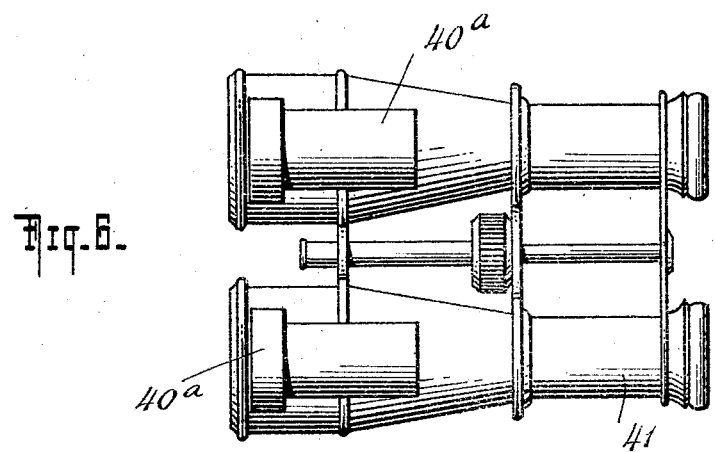
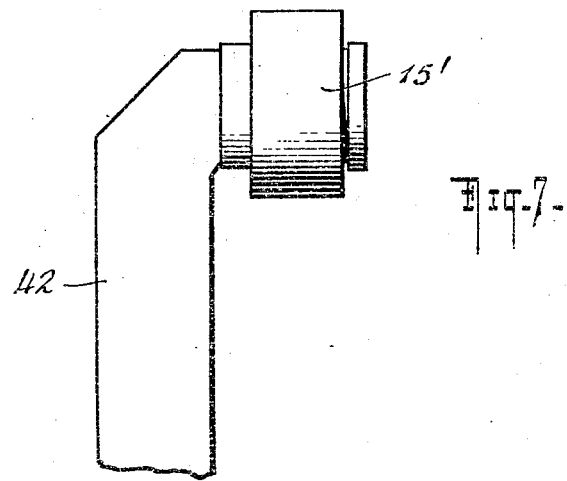
INVENTOR
RUDOLPH C.G. STAATS-OELS
BY
ATTORNEYS Patented Apr. 6, 1926.

1,579,671

UNITED STATES PATENT OFFICE.

RUDOLPH C. G. STAATS-OELS, OF BROOKLYN, NEW YORK.

SEARCHLIGHT ATTACHMENT FOR RIFLES.

Application filed November 3, 1924. Serial No. 747,455.

*To all whom it may concern:*

Be it known that I, RUDOLPH C. G. STAATS-OELS, a citizen of the United States, residing at Brooklyn, county of Kings, and State of New York, have invented certain new and useful Improvements in Searchlight Attachments for Rifles, of which the following is a specification.

This invention relates to a searchlight attachment that may be used on telescopes, monocular or binocular glasses generally; on periscopes, both for looking outward when submerged, or for looking into the depths of the water when on the surface. The invention is also intended for application to guns, rifles, or firearms generally, the invention having for an object the provision on such devices as have been outlined, of a novel attachment of this sort to render the device more efficient in use by revealing more clearly the object toward which the device to which the invention is applied may be directed.

A further object relates specifically to the provision of means for adjusting the focus of the reflector of the searchlight, according as the latter is directed toward near or far objects.

Other objects, and the advantages, of the invention will be apparent from a consideration of the following description and accompanying drawing, the various novel features of the invention being more particularly set forth in the appended claims.

Figure 1 of the drawing is a side view showing a rifle having the invention applied thereto;

Figure 5 is a side view showing the simple form of the device applied to a telescope;

Figure 6 is a face view showing the application to a pair of binoculars; and

Figure 7 is a side view indicating the multiple device applied to a periscope.

Figure 1:
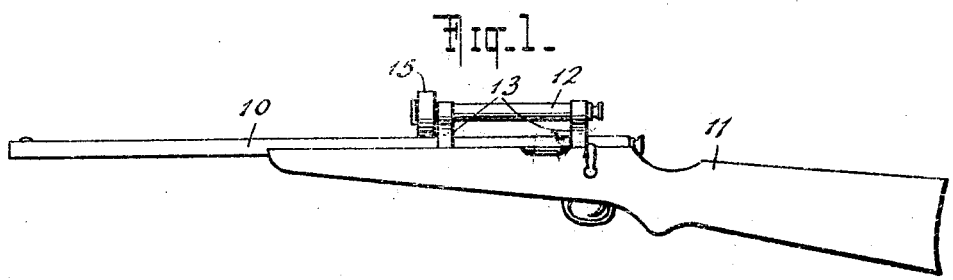
Figure 2:
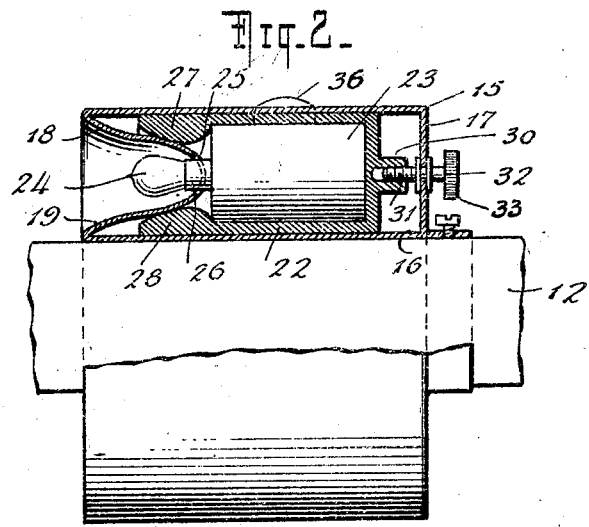
Figure 2 is an axial sectional view of the searchlight attachment.
Figure 3:
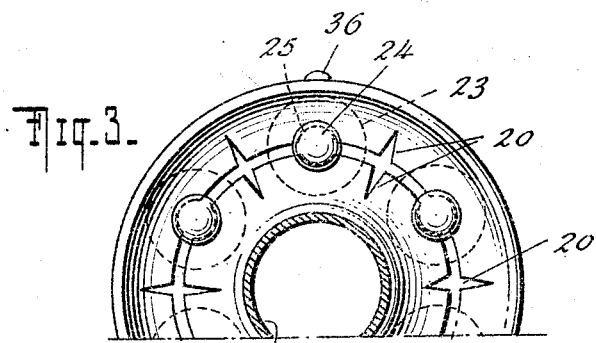
Figure 3 is a front view thereof.

In the drawing the reference numeral 10 indicates the barrel of an ordinary rifle, and 11 the stock thereof. While I have for convenience described my improved device as applied to a telescope mounted on a rifle, it is to be understood that I do not limit it to such application. Upon the barrel is mounted a telescope 12 by means of the brackets or clips 13, the telescope being also of usual construction and mounting. As here embodied my improved attachment is applied to the barrel of the telescope at the front end of the latter and comprises a cylindrical casing 15 having a central aperture through which the barrel of the telescope passes, this aperture being surrounded by an annular wall element 16 on the casing, which latter is thus in the form of a channeled annulus. The rear end of the casing is closed by a radial wall 17, while at its front end it is provided with a sectional reflector element comprising the two annular members 18 and 19, respectively, that are attached at one edge to the front ends of the outer and inner walls of the casing, respectively, and incline backward into the latter and toward one another, their rear edges being spaced a slight distance apart as shown in Fig. 3. These members are formed with a number of radial slits 20 entered from the rear ends thereof in a radial direction.

Mounted within the casing 15, to be adjustable along the latter, is a lamp holder in the form of a second annular casing element or cup 22 which fits snugly in the outer casing 15. This cup has mounted therein a number of lamps comprising the batteries 23 and bulbs 24, the bulbs projecting forward between the two reflector elements 18 and 19, which latter are recessed as at 25 to accommodate the bulb sockets 26. Fixed in the forward end of the cup 22 are the cam rings 27 and 28, which are adapted to bear on the reflector elements 18 and 19. At its rear end the cup 22 is formed with a pair of hollow bosses 30 into each of which is threaded a screw 31 which has a swivel connection as at 32 with the rear wall 17 of the casing 15, the screw passing through this wall and having a head 33 on its rear end for turning purposes. By rotating these screws 31, and moving the cup 22 forwardly or rearwardly in the casing 15, the rays of light from the device are contracted or diffused, the bulbs 24 moving longitudinally between the reflectors 18 and 19 while the curvature of the latter is varied by the pressure of the cam rings 27, 28 on the rear ends thereof. The different batteries may all be wired to a common switch operated by an ordinary slidable button 36, or separate buttons may be provided; or, instead of the series of batteries, I may connect the lamp to any other suitable source of current supply by means of a flexible cord or the like.

Figure 4:
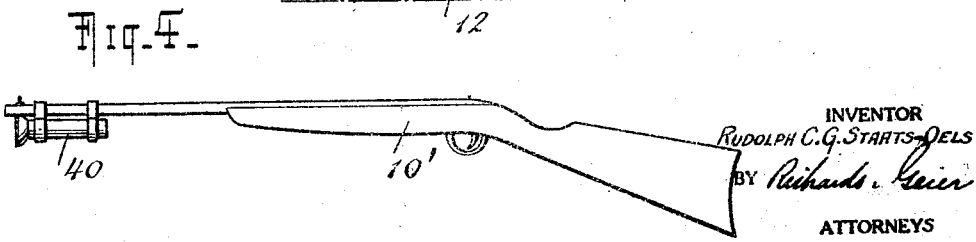
Figure 4 is a side view showing the device applied in a different position on a rifle.

In Figure 4 I have shown the device as in the form of a single lamp 40 mounted directly on a gun 10'.

In Figure 5 I have indicated the same type of lamp at 40' as mounted on a telescope 12'.

In Figure 6 I have indicated a pair of these searchlights at 40ª mounted on the respective elements of a pair of binoculars 41.

In Figure 7 I have shown at 15' the multiple device as mounted on a periscope 42.

What is claimed is:

1. A device capable of attachment to optical instruments, firearms and the like, including a casing the walls of which terminate at one end in reflector elements movable relative to each other to vary the curvature of the reflecting surface produced thereby, and a supporting member movable longitudinally in said casing and adapted to support a source of light in operative relation to said reflecting surface, said supporting member having means engageable with said reflector elements to effect the relative movement therebetween when said supporting member is moved longitudinally of said casing.

2. A device capable of attachment to optical instruments, firearms and the like, including a casing the walls of which terminate at one end in reflector elements movable relative to each other to vary the curvature of the reflecting surface produced thereby, a supporting member movable longitudinally in said casing and adapted to support a source of light in operative relation to said reflecting surface, said supporting member having means engageable with said reflector elements to effect the relative movement therebetween when said supporting member is moved longitudinally of said casing, and means carried by said casing and engaging said supporting member to move the same longitudinally.

3. In a device of the class described, a barrel, an annular channel-shaped casing mounted on said barrel, an annular channeled cup mounted in said casing to be adjustable therealong, a series of lamp bulbs mounted in said cup; a channeled annular reflector in which said lamp bulbs are positioned, and means for varying the curvature of said reflector.

4. In a device of the class described, a barrel, an annular channel-shaped casing mounted on said barrel, an annular channeled cup positioned in said casing to be adjustable therealong, a series of lamp bulbs mounted in said cup, a pair of circular reflector elements attached at their front edges to the front end of the said casing and extending rearwardly into the latter, cam members on said cup adapted to engage the said reflector elements to vary the curvature thereof upon longitudinal movement of the cup in the said casing, and means for moving said cup longitudinally in the said casing.

In testimony whereof I have affixed my signature.

RUDOLPH C. G. STAATS-OELS.